Sept. 19, 1967     TAKAJI FUNAHASHI     3,342,911

PROCESS FOR PRODUCING COMPOSITE POROUS MATERIAL

Filed Oct. 14, 1963     2 Sheets-Sheet 1

TAKAJI FUNAHASHI
INVENTOR

United States Patent Office 3,342,911
Patented Sept. 19, 1967

3,342,911
PROCESS FOR PRODUCING COMPOSITE
POROUS MATERIAL
Takaji Funahashi, 1 2-chome, Kita-takajo-machi,
Nishi-ku, Nagoya, Japan
Filed Oct. 14, 1963, Ser. No. 315,951
Claims priority, application Japan, Oct. 29, 1962,
37/48,000
7 Claims. (Cl. 264—46)

This invention relates to porous rubber materials of composite structure and more particularly to a process of producing such materials which are especially suitable for use as stamps, industrial or medical filters or the like.

An object of the invention is to provide an improved process of producing, in a simple manner, porous rubber materials having excellent porosities suitable for use as stamps for impressing on paper or the like characters, picture, drawings or the like, or as industrial or medical filters.

With the above objects in view, the invention resides in a process of producing a porous rubber material including two porous rubber portions integral with each other and having different porosities, said process comprising the steps of preparing a first body of raw rubber material consisting of a mixture of an unvulcanized raw rubber, vulcanizing chemicals required to vulcanize the raw rubber, a foaming agent capable of foaming at a first temperature to form discrete fine bubbles and a powder of salt easily soluble in water but which is not decomposed into the corresponding gas at the vulcanizing temperature, preparing a second body of raw rubber material consisting of a mixture of an unvulcanized raw material, vulcanizing chemicals required to vulcanize the last-mentioned rubber material, a second foaming agent capable of foaming at the first temperature to form discrete fine bubbles, a third foaming agent capable of foaming at a second temperature less than the first temperature to form discrete bubbles, a fourth foaming agent capable of foaming at a third temperature less than the second temperature to form continuous bubbles, and a powder of salt easily soluble in water but which is not decomposed into the corresponding gas at the vulcanizing temperature, bringing the first body of raw rubber material in intimate contact with the second body of raw rubber material, putting the assembly of the first and second bodies thus obtained in a molding die having a predetermined dimension and a predetermined inner configuration, heating the molding die and the assembly of the first and second bodies gradually up to about the third temperature, then heating the assembly up to about the second temperature, then heating the assembly up to a temperature somewhat above the first temperature to vulcanize the first and second bodies of rubber material into a unitary structure while foaming all the foaming agents in three separate stages to render the first and second bodies of rubber material differently porous, removing the resulting single unitary body of vulcanized rubber material from molding die, and washing the single unitary body of vulcanized rubber material with water to remove the powders of the salts from the same.

The invention will now become more readily apparent from the following detailed description taken in conjunction with the accompanying drawings in which.

Figure 1:
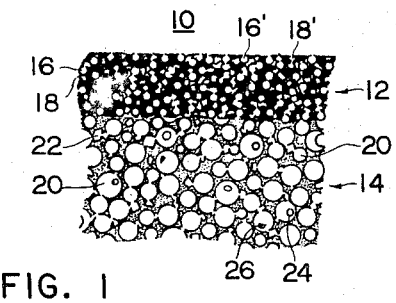
FIG. 1 is a fragmental sectional view in very enlarged scale of a porous rubber member produced in accordance with the teachings of the invention.

While the invention will now be particularly described in terms of a porous rubber stamp it is to be understood that the same is equally applicable to the production of industrial and medical filters of porous rubber material.

In order to make the multi-layer porous rubber material, an amount of unvulcanized raw rubber has admixed therewith any suitable known vulcanizing agent, and any suitable known filler and the like in amounts sufficient to provide a rubber product, and further has added thereto a foaming agent capable of foaming in the form of discrete fine bubbles at an elevated temperature of from about 150° C. to 160° C. and a powder of a salt which is readily soluble in water but which is not decomposed into the corresponding gas at the vulcanizing temperature, in appropriate proportions. The resulting mixture is thoroughly kneaded and calendered into a thin sheet which will hereinafter be called an "A sheet." If desired, a vulcanizing accelerator, an age resister, a softener, a reinforcing agent and/or the like may be admixed with the raw rubber.

While either natural rubber or synthetic rubbers may be used, synthetic rubbers are preferably used because of their excellent resistances to oils and age, and the like. Examples of suitable foaming agents are hydrazine derivatives capable of foaming at the temperatures above specified and examples of a suitable salt are sodium chloride and sodium sulfate.

Another sheet which is somewhat thicker than the A sheet and hereinafter called a "B sheet" is similarly prepared except for the addition of three foaming agents, i.e. a foaming agent capable of foaming in the form of continuous bubbles at a relatively low temperature of from about 60° C. to 90° C., a foaming agent capable of foaming in the form of discrete bubbles at a moderate temperature of from about 100° C. to 110° C. and a foaming agent capable of foaming in the form of discrete fine bubbles at an elevated temperature of from about 130° C. to 160° C. Sodium bicarbonate is preferably used as the foaming agent capable of foaming at the relatively low temperature and the foaming agents capable of foaming at the moderate and elevated temperature respectively can be suitably selected from hydrozine derivatives capable of foaming at the specified temperature respectively. It has been found that p-toluene sulfonyl hydrazide and p-p' oxy-bis-benzene sulfonyl hydrazide can be used as the foaming agents effective at the moderate and elevated temperatures respectively with the best results.

It has been found that, for the purpose of preparing a stamp, 2 parts by weight of p-p' oxy-bis-benzene sulfonyl hydrazide foaming agent and 800 to 900 parts by weight of sodium chloride or sulfate are preferably admixed with 100 parts by weight of the raw rubber material for the A sheet and that 10 parts by weight of sodium bicarbonate foaming agent, 5 parts by weight of p-toluene sulfonyl hydrazide foaming agent, 4 parts by weight of p-p' oxy-bis-benzene sulfonyl hydrazide foaming agent and 900 to 1000 parts by weight of sodium chloride or sulfate are preferably admixed with 100 parts by weight of the raw rubber material for the B sheet to give the best result. The amounts of the ingredients just specified can, of course, be varied in accordance with the desired final product.

Then the A sheet is placed upon the B sheet in intimate contact therewith and the stack of sheets is put in a molding die having therein a working space having suitable dimensions and predetermined configuration dependent upon the dimensions and configuration of the finished product. Since it is assumed that a porous rubber stamp bearing characters, a picture, drawing or the like is to be prepared by this molding technique, in the molding die used the lower die portion has the inner surface of the bottom thereof engraved in a complemental configuration to the engraved surface to be produced on the finished stamp. Thus the assembly of sheets is put in such a molding die with the exposed surface of the A sheet abutting against the engraved bottom of the lower die portion. Then the molding die can have applied thereto with a pressure of about 200 kg./cm.$^2$ to cause that surface of the A sheet contacting the engraved bottom surface of the lower die portion to intimately engage the protrusions and recesses on the bottom surface of the die portion. Thereafter, the molding die is set to leave therein a proper clearance sufficient to permit the A and B sheets to inflate due to the foaming of the foaming agents.

The molding die with the stack of sheets therein is then heated while being kept under a pressure of about 200 kg./cm.$^2$ to vulcanize the stack of sheets at progressively increasing temperatures. During this heating operation, the A sheet is bonded to the B sheet to form a single unitary structure while the low temperature foaming agent contained in the B sheet first begins to evolve the corresponding gas at a temperature on the order of 60° C. until the same reaches the condition of greatest foaming activity at a temperature of approximately 90° C. whereupon a multiplicity of relatively large continuous bubbles are formed within the B sheet. As the heating temperature increases, the moderate temperature foaming agent then begins to evolve the corresponding gas at about 100° C. and evolves the maximum volume of the gas at about 110° C. to form a multiplicity of discrete bubbles within the B sheet. It is to be noted that when the moderate temperature foaming agent is foaming the relatively large continuous bubbles already formed within the B sheet by the foaming of low temperature foaming agent are progressively compressed and decreased in volume by the action of pressure provided by the discrete bubbles originating from the moderate temperature foaming agent until walls surrounding the bubbles are broken, permitting the continuous bubbles to communicate with the now formed discrete bubbles to form many branch passageways.

As the heating temperature further increases, the high temperature foaming agent begins to evolve the corresponding gases at approximately 130° C. and evolves the maximum volume of the gas at a temperature of from approximately 150° C. to 160° C. to form a multiplicity of discrete fine bubbles not only within the B sheet but also within the A sheet integral with the B sheet. It is again to be noted that when the high temperature foaming agent is foaming within the B sheet, the continuous bubbles with many branch passageways formed within the B sheet by the previous foaming of the low and moderate temperature foaming agent are progressively compressed and decreased in volume by the action of high pressure provided by the discrete bubble originating from the high temperature foaming agent until the walls surrounding such bubbles and branch portions are broken, permitting the bubbles and their branch passageways to communicate with said discrete fine bubbles whereby the continuous fine gas cells including a variety of extremely complicated branch passageways are formed within the B sheet.

At the same time the A sheet has only a multiplicity of discrete fine gas cells formed therein due to the foaming of the high temperature foaming agent contained in the sheet. Thus the A sheet and the B sheet integral therewith inflate to completely fill the interior of the molding die with the result that the unitary structure of the porous A and B sheets has on that surface of the A sheet contacting the inner engraved surface of the die a pattern complemental in configuration to that formed on such engraved surface. At this time the molding and vulcanization operation has been completed. Then the die and the product are cooled to room temperature. The cooled porous rubber member thus prepared is removed from the molding die.

It is to be noted that the powders of the easily soluble salts contained in the A and B sheets remain in the form of a powder within the vulcanized sheets in the spaces among the continuous gas cells and among the discrete gas cells because the salts have been preliminarily chosen so as not to be decomposed into gases at the vulcanizing temperature.

The thus molded rubber member after it has been cut into desired shapes or without such cutting, is subject to any suitable treatment for removing the powdered salts remaining in the same. To this end, the molded and vulcanized rubber member can be alternately immersed in cold water and warm water and repeatedly expanded and contracted. Alternatively the rubber member can first be immersed in water to absorb the same and then removed from the water followed by the removal of water. This procedure can be repeated as desired. During such a washing operation the easily water-soluble salts in the form of a powder remaining within the A and B sheets among the discrete cells and among the continuous cells are dissolved out into the water and removed, that portion of the salts remaining on and near the outer surface of the rubber member being first dissolved out to permit pinholes formed by this dissolving out of the salts to communicate with the adjacent continuous and discrete cells and the water then entering the thus formed pinholes dissolving that portion of the salts remaining in the deeper portion of the rubber member, so that these soluble salts are removed. This dissolving out and removal of the salts proceeds progressively toward the interior of the rubber member until the entire amount of the salts is removed from the rubber member. It is noted that the dissolving out and removal of the salts are rapidly performed due to the presence of the discrete and continuous cells.

Figure 2:
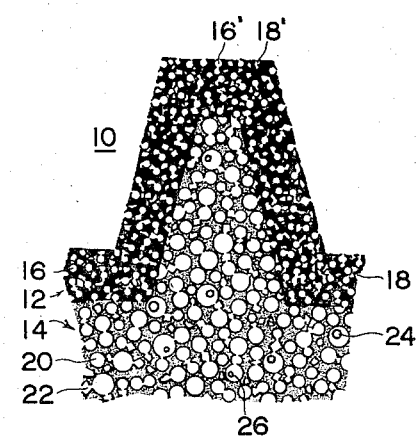
FIG. 2 is a view similar to FIG. 1 but illustrating another portion of the porous rubber member illustrated in FIG. 1.

Referring now to FIGS. 1 and 2 of the drawings wherein the same reference numerals designate the corresponding parts, there are illustrated two different portions of a stamp member of porous rubber produced in accordance with the process of the invention thus far described. FIG. 1 shows a base portion of the stamp member while FIG. 2 shows a portion thereof bearing a character. It is noted that the stamp member illustrated is greatly enlarged in order to clearly illustrate the internal structure thereof. The stamp member generally designated by the reference numeral 10 includes a relatively thin surface layer of foam rubber material 12 which has been hereinbefore called the A sheet and a relatively thick foundation of spongy rubber material 14 integral with the surface layer. It will be readily seen that the foundation 14 corresponds to the B sheet as previously described. By "foam material" is meant a material which includes a multiplicity of discrete fine cells normally not communicating with each other while by "spongy material" is meant a material which includes a multiplicity of cells of different sizes communicating with each other.

As shown, the surface layer 12 of the stamp member is composed of a porous rubber material including therein a multiplicity of discrete fine cells illustrated as circular or nearly circular white dots 16 and a multiplicity of pinholes represented by white dots 18 having irregular shapes. As previously described, the discrete fine cells originate from foaming of the high temperature foaming agent and the pinholes have been formed by removal of the easily soluble salt. From the above description of the manner of the removal of the salts, it will be appreciated that the pinholes are normally closed, but under stress they communicate with the adjacent discrete fine cells and hence act as valves.

In addition, the exposed surface of the surface layer 12 includes substantially uniformly distributed thereon a multiplicity of valve-like pinholes 18' similar to the pinholes 18 as above described and a multiplicity of discrete fine cells 16' similar to the cells 16 as above described. It is to be noted that these pinholes 18' and cells 16' communicate with the internal cells and pinholes and are adapted to be opened under stress and hence act as valves. However, it is to be understood that the exposed surface of the surface layer 12 macroscopically resembles a continuous surface but is not a solid surface such as that usually formed by the prior art practice.

As previously described, the low, moderate and high temperature foaming agents have foamed at different temperatures at three separate stages during vulcanizing of the B sheet. Therefore, it is to be understood that the foundation 14 includes, in addition to discrete fine cells such as 16 and pinholes such as 18, a multiplicity of relatively large cells communicating with each other and with the cells 16 through both the pinholes 18 and a multiplicity of connecting passageways. These relatively large cells and passageways resulted from foaming of the low and moderate temperature foaming agents and are designated by the reference numerals 20 and 22 respectively in FIGS. 1 and 2. Thus the foundation 14 is composed of a spongy rubber material including therein a multiplicity of continuous cells communicating with each other in an extremely complicated manner. Accordingly the porous rubber member of the invention has composite structure including a pair of porous rubber layers integral with each other and having different porosities.

In FIGS. 1 and 2 some of the cells are shown as if they were discrete. However, such cells communicate with other cells, other pinholes and/or other branch passageways positioned in planes other than the plane of FIGS. 1 and 2. Small circles 24 and dots 26 within the cells mean that the cells with the circles and dots communicate with the other cells or the other passageways and the other pinholes just described respectively.

It has been found that the continuous fine cells within the foundation are defined by the associated, very thin partitions and that the porous rubber member has an apparent density substantially equal to several times the weight of rubber itself.

The following examples illustrate the manner of making the porous rubber stamp member. The compositions are expressed by weight unless otherwise indicated.

Example I

Added to 100 parts of a synthetic rubber NBR, which is acrylonitrile butadiene rubber, were 2 parts of sulfur, 5 parts of white zinc oxide, 3 parts of a vulcanizing accelerator, 33.5 parts of a softener consisting of a liquid rubber such as lower polymerized NBR, vaseline and DBP (dibutyl phthalate), 50 parts of carbon black, 2.5 parts of reinforcing agent (an antioxidant), 2 parts of an age resister and 2 parts of a foaming assistant as well as 2 parts of p-p' oxy-bis-benzene sulfonyl hydrazide as a high temperature foaming agent, and 800 parts of powdered sodium chloride. The resulting mixture was thoroughly kneaded and calendered into a sheet having a thickness of from 0.3 to 1 mm.

Another sheet having a thickness of from 5 to 10 mm. was similarly prepared from a mixture of 100 parts of a synthetic rubber NBR, 2 parts of sulfur, 5 parts of white zinc oxide, 3 parts of a vulcanizing accelerator, 32 parts of a softener consisting of liquid rubber such as lower polymerized NBR, vaseline and DBP, 55 parts of carbon black, 2.5 parts of a reinforcing agent, 2 parts of an age resister and 10 parts of a foaming assistant as well as 10 parts of sodium bicarbonate as a low temperature foaming agent, 5 parts of p-toluene sulfonyl hydrazide as a moderate temperature foaming agent, 4 parts of p-p' oxy-bis-benzene sulfonyl hydrazide as a high temperature foaming agent and 900 parts of sodium chloride.

The thinner sheet was placed upon the thicker sheet in intimate contact therewith and then the stack of sheets was put in a molding die having the desired dimensions and a desired pattern such as characters, a picture, drawing or the like on the inner surface of the bottom with the thinner sheet contacting that inner surface of the bottom. Then the molding die was placed under a pressure on the order of 200 kg./cm.$^2$ at room temperature whereby the thinner sheet is forcedly pressed in intimate contact with the inner surface of the die bottom so as to have formed therein a pattern complemental to the pattern on the surface of the die bottom. The die was set to leave clearances approximately 1 mm. wide between the inner side walls thereof and all sides of the sheet stack and between the upper inner wall thereof and the upper surface of the stack.

The molding die was then progressively heated up to about the foaming temperature of the low temperature foaming agent, then to about the foaming temperature of the moderate temperature foaming agent, and then to approximately 180° C., a temperature slightly above the foaming temperature of the high temperature foaming agent, to vulcanize the sheet stack. After the completion of vulcanization, the vulcanized rubber member was removed from the die and thoroughly washed in cold water and/or warm water to wash away the sodium chloride in the manner as previously described. Then the washed rubber member was dehydrated and dried. The resulting porous rubber member could be satisfactorily used as a stamp.

Example II

The process of Example I was repeated except that sodium sulfate was substituted for sodium chloride in an equal amount. The resulting product gave excellent performance.

Figure 3:
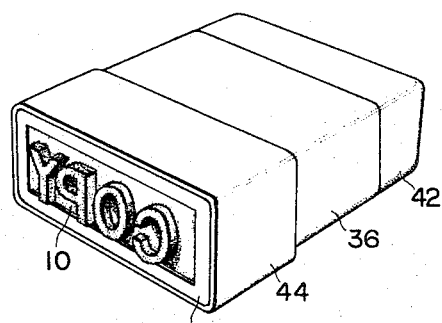
FIG. 3 is a perspective view of a stamp device utilizing a porous rubber material according to the invention.
Figure 4:
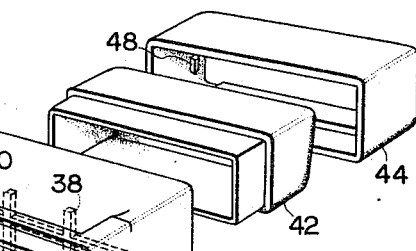
FIG. 4 is an exploded perspective view of the stamp device illustrated in FIG. 3.
Figure 4:
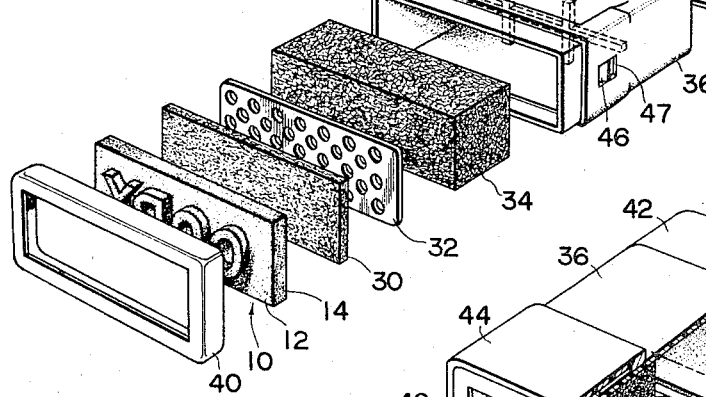
Figure 5:
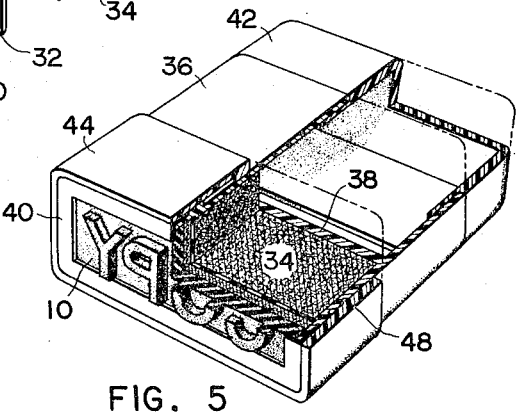
FIG. 5 is a perspective view of the stamp device of FIGS. 3 and 4 with parts cut away for purpose of illustrating the internal construction thereof.
Figure 6:
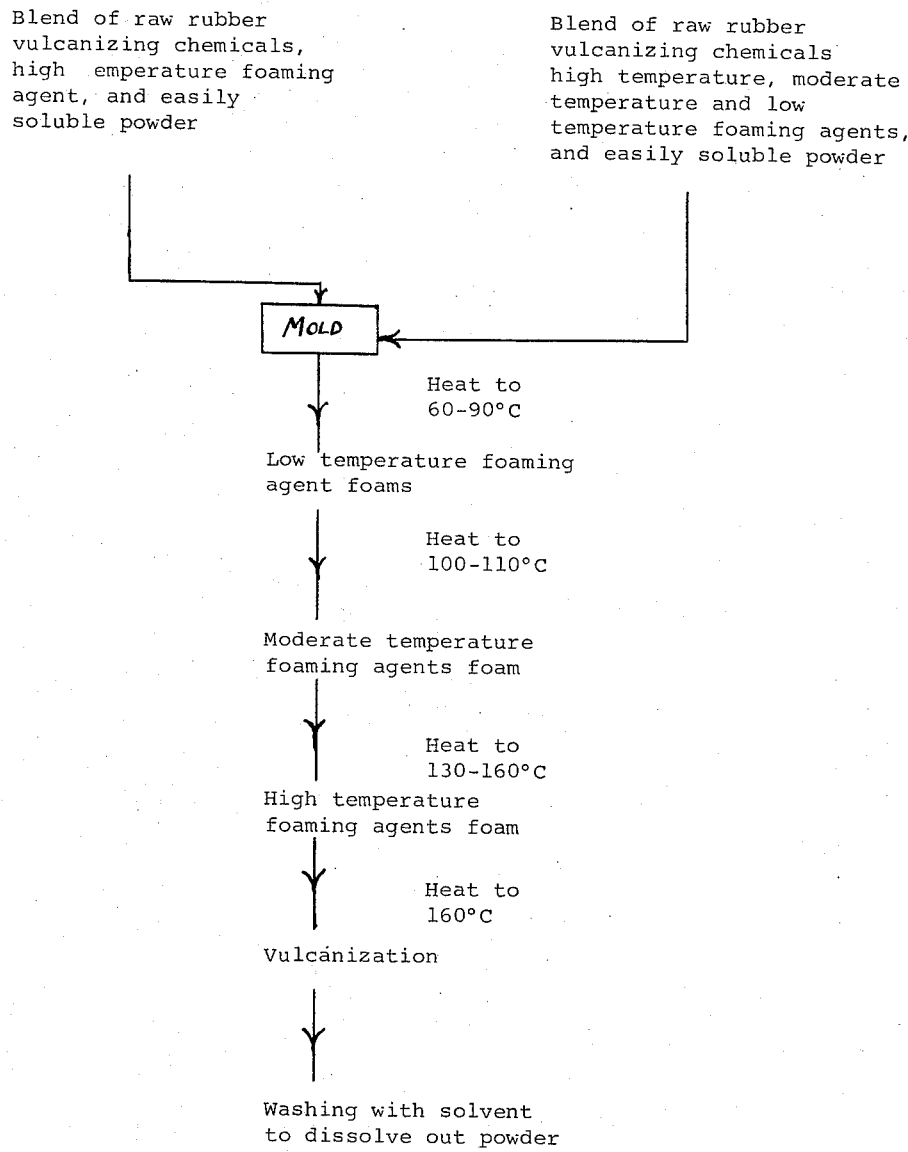
FIG. 6 is a flow diagram of the process according to the invention.

In order to use the porous rubber member as previously described in conjunction with FIGS. 1 and 2, as a stamp member the same can be conveniently incorporated into an assembly shown in FIGS. 3 to 5 inclusive.

Referring now to FIGS. 3 through 5, a porous rubber member 10 includes a surface layer of foam rubber material 12 bearing a desired relief pattern, for example, characters and a foundation of spongy rubber material 14 and is shown as being of rectangular cross-section. The character bearing rubber member 10, an ink storage layer such as a relatively flat body of suitable felt 30, an apertured plate 32, and an ink replenisher 34 made for example of felt are stacked in the named order to form a stack of laminations. It is to be understood that the components 30, 32 and 34 correspond in cross-section to the rubber member 10. Then the stack of laminations thus formed is fitted into a housing 36 having a complemental internal shape. The housing 36 is provided in the interior with a stop member in the form of intersected rods 38 in such a position that when the stack of lamination 10, 30–34 is fitted in the housing the relief pattern (in this case the characters) projects beyond the adjacent end of the housing. Then a stop 40 is secured to this end of the housing to cooperate with the stop member 38 to maintain the components 10, 30–34 in place. A cover member 42 is then fitted into that end portion of the housing 36 remote from the character bearing member 10 to complete a stamp device.

In order to prevent the characters on the exposed surface of the rubber member 10 from being damaged during no-service, a protective frame 44 is movably disposed around that end portion of the housing 36 adjacent to the rubber member 10. The housing 36 is provided in each of the opposed sides with a pair of recesses 46, 47 capable of selectively engaging a projection 48 formed on the internal surface of the frame 44 to selectively hold the frame in its inoperative position so that the free end of the frame projects slightly beyond the relief pattern on the rubber member to protect the same against damage and in its operative position that the free end of the frame is substantially flush with the free end of the housing 36 to permit the relief pattern to project beyond the end of the stamp device.

As shown in FIG. 4 the housing 36 may be provided on each of the other opposed sides with a ridge 50 ensuring that the protective frame 42 is prevented from passing through the character bearing side of the stamp device.

When the stamp device as above described is first used, the cover 42 is removed from the housing 36 and then any suitable printing ink is poured into the ink replenisher 34 to sufficiently fill the same. Thereafter, the cover 42 can be engaged by the housing 36. The ink in the replenisher 34 will progressively pass through the apertures in the plate 32, and the ink storage layer 30 into the multiplicity of continuous fine cells within the foundation 14 of the porous rubber member 10. Then the protective frame 44 is put in its operative position.

Under these circumstances, the exposed end surface of the rubber member 10 can be manually pressed against a sheet of paper. If this operation is repeated, the normally closed pinholes as previously described are repeatedly opened by the action of the pressing force and closed by their resilience. When opened the valve-like pinholes permit the ink to pass from the foundation 14 to the surface layer 12 and also to pass toward the exposed end surface of the surface layer. Finally, the ink fill all voids in the surface layer and reaches the normally closed pinholes and fine cells on the exposed surface. Thus the stamp device is ready for printing. In other words, the stamp device need only be pressed against sheet papers or the like to be printed.

This pressing of the stamp device causes the normally closed pinholes on the surface of the surface layer to be opened to permit that portion of the ink positioned adjacent that surface to be an amount of printing ink having a weight several times like pinholes resulting in clear printing substantially free from monk.

As previously described, the foundation or the B sheet includes a mulitplicity of complicated continuous cells defined by the extremely thin partitions. Therefore, the foundation can store the printing ink in a weight reaching several times the weight of the foundation. This permits the stamp device to be used for a long time. However, it is to be noted that the valve-like pinholes on the exposed surface of the surface layer control the amount of the printing ink applied to an article to be printed such that only the required amount of the ink passes from the foundation to the surface layer with the result that clearer printing is effected.

While the invention has been described in terms of a rubber member for stamp bearing an engraved pattern the same is equally applicable to a porous rubber member which is succeedingly engraved. In the latter case, the process of the invention as previously described is repeated except that a molding die not including an engraved surface is used. For example, the use of a molding die including a pair of parallel working surfaces may provide a porous rubber member illustrated in FIG. 1. Also such rubber member may be advantageously used as a stamp pad for storing a printing ink.

While there has been described what is presently considered a preferred embodiment of the invention it should be understood that the invention is not desired to be limited to the process described herein and that numerous modifications and changes may be resorted to without departing from the spirit and scope of the invention. Also it is to be understood that the invention has uses other than the stamp described herein. For example, the invention may be applied to produce industrial or medical filters. In this case, a porous rubber member in the form of a sheet such as shown in FIG. 1 may be advantageously used. Alternatively a porous rubber member including a B layer portion can be sandwiched between a pair of A layer portions. Also a B layer of circular, polygonal across-section or other suitable cross-section may be integrally wrapped with an A layer and vice versa.

What I claim is:

1. A process of producing a porous rubber material including two porous rubber portions integral with each other and having different porosities, said process comprising the steps of preparing a first body of raw rubber material consisting of a mixture of an unvulcanized raw rubber, vulcanizing chemicals required to vulcanize the raw rubber, a foaming agent capable of foaming at a first relatively high temperature to form discrete fine bubbles and a powder of salt easily soluble in water and which remains undecomposed at the vulcanizing temperature, preparing a second body of raw rubber material consisting of a mixture of an unvulcanized raw rubber, vulcanizing chemicals required to vulcanize the last-mentioned rubber material, a second foaming agent capable of foaming at said first temperature to form discrete fine bubbles, a third foaming agent capable of foaming at a second relatively moderate temperature less than the first temperature to form discrete bubbles, a fourth foaming agent capable of foaming at a third relatively low temperature less than the second temperature to form continuous bubbles, and a powder of salt easily soluble in water and which remains undecomposed at the vulcanizing temperature, placing the first body of raw rubber material in intimate contact with the second body of raw rubber material, putting the assembly of the first body and the second body thus obtained into a molding die having a desired dimension and inner configuration, heating gradually the molding die and the assembly of the first and second bodies up to about the third temperature, then heating the molding die and the assembly up to about the second temperature, and then heating the molding die and the assembly up to a temperature somewhat above the first temperature to vulcanize the first and second bodies of rubber material into a unitary structure, the foaming agents foaming at the three separate temperatures to render the first and second bodies of rubber material differently porous, removing the resutling single unitary body of vulcanized rubber material from molding die, and washing the single unitary body of vulcanized rubber material with water to remove the powders to the salts therefrom.

2. A process as claimed in claim 1, wherein each of the first and second foaming agents is selected from hydrazne derivatives capable of foaming at a temperature of from approximately 150° C. to 160° C.

3. A process as claimed in claim 1, wherein the first and second foaming agents are p-p′ oxy-bis-benzene sulfonyl hydrazide and admixed with 100 parts, by weight of the raw rubber material in amounts of 2 and 4 parts by weight for the first body and the second body respectively.

4. A process as claimed in claim 1, wherein the third foaming agent is selected from hydrazine derivatives capable of foaming at a temperature of from approximately 100° C. to 110° C.

5. A process as claimed in claim 1, wherein the third foaming agent is p-toluene sulfonyl hydrazide and admixed in an amount of 5 parts by weight, with 100 parts by weight of the raw rubber material.

6. A process as claimed in claim 1, wherein the fourth foaming agent is sodium bicarbonate and admixed in an amount of 10 parts by weight, with 100 parts by weight of the raw rubber material.

7. A process as claimed in claim 1, wherein the easily water-soluble salt is selected from the group consisting of sodium chloride and sodium sulfate and admixed with 100 parts by weight of the raw rubber material in amounts of from 800 to 900 and 900 to 1000 parts by weight for first body and the second body respectively.

(Other references on following page)

References Cited

UNITED STATES PATENTS

| | | | |
|---|---|---|---|
| 2,349,613 | 5/1944 | Chollar | 264—49 XR |
| 2,353,877 | 7/1944 | Chollar | 264—49 |
| 2,381,706 | 8/1945 | Wilson | 264—49 |
| 2,392,521 | 1/1946 | Chollar | 101—327 |
| 2,427,765 | 9/1947 | Chollar | 101—327 |
| 2,507,869 | 5/1950 | Rothermel | 264—54XR |
| 2,526,311 | 10/1950 | Wilson | 264—46 XR |
| 2,598,806 | 6/1952 | Laner | 101—327 XR |
| 2,638,049 | 5/1953 | MacPhee et al. | 101—327 |
| 2,763,208 | 9/1956 | Rockoff et al. | 101—327 XR |

FOREIGN PATENTS

| | | |
|---|---|---|
| 151,084 | 9/1920 | Great Britain. |
| 582,474 | 11/1946 | Great Britain. |
| 584,864 | 1/1947 | Great Britain. |
| 653,546 | 5/1951 | Great Britain. |
| 743,757 | 1/1956 | Great Britain. |

ALEXANDER H. BRODMERKEL, *Primary Examiner.*

DONALD J. ARNOLD, D. KLEIN, *Examiners.*

H. J. STRNISHA, P. E. ANDERSON,
*Assistant Examiners.*